(12) United States Patent
Simonsen et al.

(10) Patent No.: US 10,007,533 B2
(45) Date of Patent: Jun. 26, 2018

(54) VIRTUAL MACHINE MIGRATION

(75) Inventors: Harold C. Simonsen, Salt Lake City, UT (US); Ashton R. Snelgrove, Salt Lake City, UT (US); Thomas S. McCullagh, Orem, UT (US); Chris R. Featherstone, South Jordan, UT (US)

(73) Assignee: V3 Systems Holdings, Inc., Draper, UT (US)

( * ) Notice: Subject to any disclaimer, the term of this patent is extended or adjusted under 35 U.S.C. 154(b) by 138 days.

(21) Appl. No.: 13/592,251

(22) Filed: Aug. 22, 2012

(65) Prior Publication Data

US 2014/0059539 A1 Feb. 27, 2014

(51) Int. Cl.
*G06F 9/455* (2018.01)
*G06F 9/445* (2018.01)
*G06F 11/14* (2006.01)

(52) U.S. Cl.
CPC ...... *G06F 9/44505* (2013.01); *G06F 11/1438* (2013.01); *G06F 11/1484* (2013.01); *G06F 2009/4557* (2013.01)

(58) Field of Classification Search
USPC .......................................................... 718/1
See application file for complete search history.

(56) References Cited

U.S. PATENT DOCUMENTS

| 2009/0125904 A1* | 5/2009 | Nelson .............................. 718/1 |
| 2009/0222498 A1* | 9/2009 | Lu ..................... G06F 17/30067 |
| 2009/0282101 A1* | 11/2009 | Lim et al. ..................... 709/203 |
| 2010/0023565 A1* | 1/2010 | Colbert et al. ................ 707/204 |

* cited by examiner

*Primary Examiner* — Emerson Puente
*Assistant Examiner* — Steven Do
(74) *Attorney, Agent, or Firm* — Miller, Matthias & Hull LLP

(57) ABSTRACT

Migration of a virtual machine from a source host computing system to a target host computing system in a context in which a centralized portion of virtual machine state is maintained in a storage that is accessible to both the source host computing system and the target host computing system, and a localized portion of the virtual machine state is maintained in local storage of the source host computing system. For instance, the centralized portion of the virtual machine state might be user data, and the localized portion might be backing files for the virtual machine. In order to support the potential migration, at least a portion of the localized portion of the virtual machine state are backed up to a storage that is accessible to both the source and target host computing systems.

22 Claims, 8 Drawing Sheets

VIRTUAL MACHINE MIGRATION

BACKGROUND

For more than 40 years, technologists have known that one way to lower computing costs is to simultaneously share resources across multiple components and/or machines. This concept eventually led to the so-called client/server networking model where multiple desktop computers were linked together to a server where files and printer resources could be shared. Given the success achieved in improved performance and lowered costs through virtual servers, companies have been diligently attempting to replicate their efforts with "virtual desktops", which will now be explained.

As a user interfaces with a client computing system (hereinafter referred to as a "client"), the user is presented with a desktop environment. The desktop environment may include an intuitive visualization of various icons, windows, and other tools that that user may interact with to manipulate the various applications and environments offered by the desktop environment.

As events occur (such as user input), the desktop environment is processed in a manner that is appropriate given the event, resulting in perhaps some change to the state of the desktop environment. Conventionally, such desktop processing occurs on the client. However, desktop virtualization involves the offloading of the desktop processing to a location other the client (hereinafter referred to as a "virtual machine host", "host computing system" or simply "host"), which location is perhaps even remote from the client. That offloaded location may be a server, a server cluster, or a server cloud.

The host maintains a virtual machine for each supported desktop environment. The virtual machine has access to all of the desktop state necessary to construct an image for how the desktop environment should appear. The virtual machine also manages the processing that serves up desktop images to the corresponding client, which are rendered by the client as they are received.

As the client interacts with the displayed desktop image, that client input is transmitted to the host. The corresponding virtual machine at the centralized desktop location interprets the client input, and processes the desktop. In response to this input, or in response to some other detected event, the virtual machine changes the state of the desktop if appropriate. If this changed state results in a change in how the desktop appears, the virtual machine constructs a different desktop image, and causes the host to transmit the altered desktop image to the client. From the user's perspective, this occurs often fast enough that the displayed desktop at the client is substantially immediately responsive to the user input at the client.

A typical host may manage a number of virtual machines for a corresponding number of clients. In some cases, the host may manage hundreds of virtual machines. The host provides software and data support (hereinafter referred to as the "support resources") to the virtual machine(s). For instance, the operating system and certain applications may be provided by the host. Supporting data may also be included within the support resources. For instance, user data (such as persistent preference information) may also be stored by the host.

All of the software and data support resources are conventionally located on the host itself. An alternative conventional solution occurs when an organization has access to multiple hosts. To provide backup, the organization will provide access to a storage area network (SAN) to multiple physical appliances, and store the software and data support resources on the SAN. If a failure were to occur with a host, the support resources are still available on the SAN from the other physical appliance. Thus, an instance of the physical machine may be constructed on the other host, and mapped to the corresponding software and data storage resources on the SAN, thereby effecting recovery.

BRIEF SUMMARY

At least one embodiment described herein relates to the migration of a virtual machine from a source host computing system to a target host computing system in a context in which a centralized portion of virtual machine state is maintained in a storage that is accessible to both the source host computing system and the target host computing system, and a localized portion of the virtual machine state is maintained in local storage of the source host computing system. For instance, the centralized portion of the virtual machine state might be user data, and the localized portion might be backing files for the virtual machine. In order to support the potential migration, at least a portion of the localized portion of the virtual machine state is backed up to a storage that is accessible to both the source and target host computing systems. For instance, a portion of the backing files may be backed up.

When migration is to occur, the virtual machine ceases operation on the source host computing system, thereby preventing the virtual machine from editing the centralized portion of the virtual machine state, which could potentially leave the centralized portion in an inconsistent state. Furthermore, some or all of the backed up localized portion of the virtual machine state (e.g., the backing files) are restored to local storage of the target host computing system. The backing infrastructure is notified of the migration, and the virtual machine is then loaded using the restored localized portion of the virtual machine state. The backing infrastructure may be, for instance, the collection of one or more components responsible for hosting virtual machines and maintaining a concept of where the backing files are located for each of the virtual machines.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with at least one embodiment described herein, the migration of a virtual machine from a source host computing system to a target host computing system is described. This migration occurs in a context in which a centralized portion of virtual machine state is maintained in a storage that is accessible to both the source host computing system and the target host computing system, and a localized portion of the virtual machine state is maintained in local storage of the source host computing system. For instance, the centralized portion of the virtual machine state might be user data, and the localized portion might be backing files for the virtual machine. In order to support the potential migration, at least a portion of the localized portion of the virtual machine state is backed up to a storage that is accessible to both the source and target host computing systems.

When migration is to occur, the virtual machine ceases operation on the source host computing system. Furthermore, some or all of the backed up localized portion of the virtual machine state (e.g., the backing files) are restored to local storage of the target host computing system. The backing infrastructure is notified of the migration, and the virtual machine is then loaded using the restored localized portion of the virtual machine state. The backing infrastructure may be, for instance, the collection of one or more components responsible for hosting virtual machines and maintaining a concept of where the backing files are located for each of the virtual machines. First, some introductory discussion regarding computing systems will be described with respect to FIG. 1. Then, embodiments of the migration will be described with respect to FIGS. 2 through 7.

Figure 1:
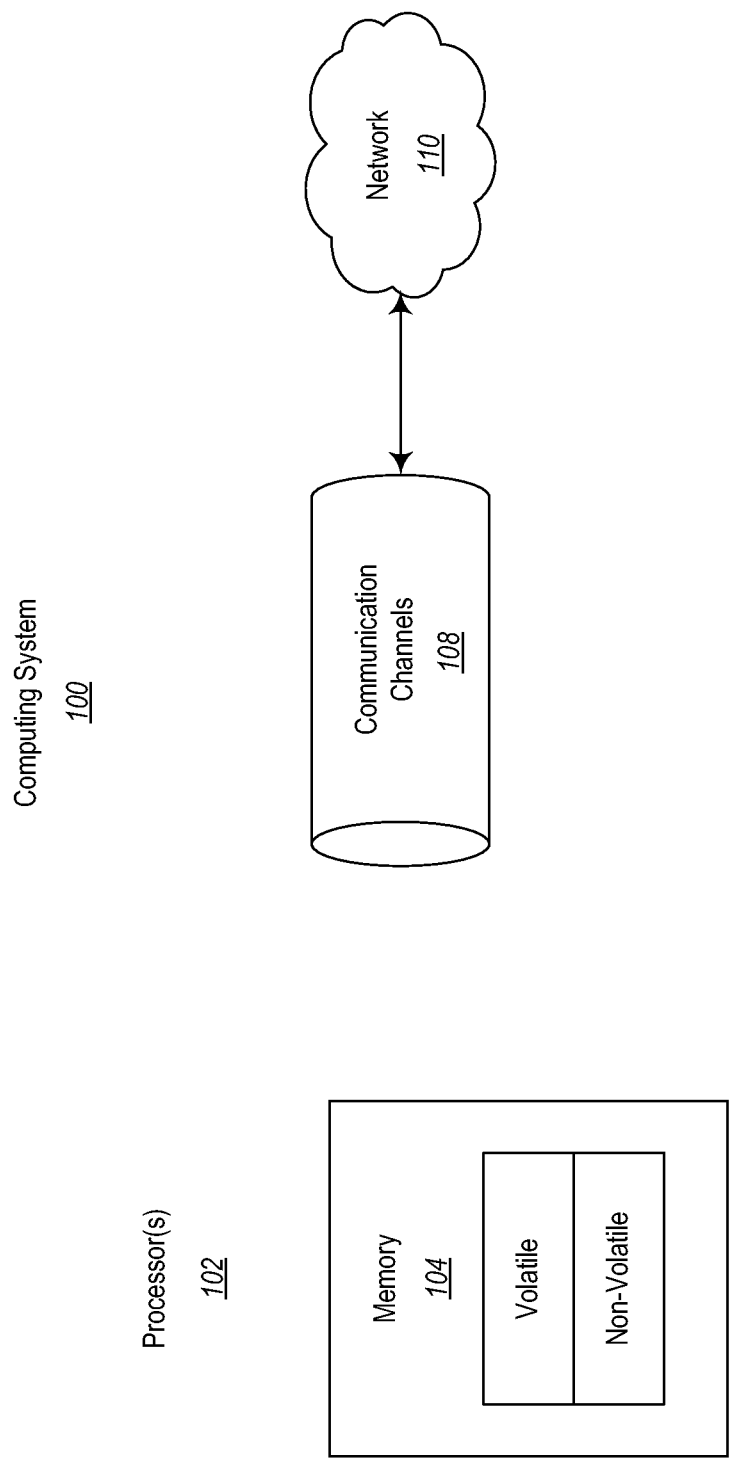
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
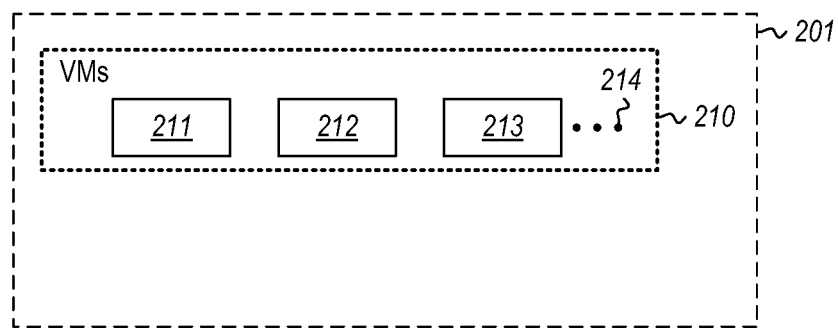
FIG. 2 illustrates a virtual machine environment that includes a single physical support environment supporting multiple virtual machines.

FIG. 2 illustrates a virtual machine operation environment 200. The operation environment includes a host computing system 201 in which a set of virtual machines 210 operate. The host computing system 201 may be, for example, the computing system 100 of FIG. 1, or any other device, system, or combination thereof that is capable of providing physical resources to assist in the operation of virtual machines.

There may be any number of virtual machines 210 operating in the host computing system 201. In FIG. 2, there are three virtual machines 211, 212 and 213 shown, with ellipses 214 representing that the number of virtual machines 210 may be as few as one, but potentially as many thousands, or even more. Each virtual machine manages state (e.g., a desktop state) for a corresponding client that may perhaps be remotely located. The virtual machine provides an image representing a desktop image to the corresponding client, and alters the image or other desktop state in response to detected events, such as, for example, a user interfacing with the current desktop image.

As the client interacts with the displayed desktop image corresponding to a virtual machine, that client input is transmitted to the host computing system 201. The corresponding virtual machine interprets the client input, and processes the client input. In response to this input, or in response to some other detected event, the virtual machine changes the state of the virtual desktop if appropriate. If this changed state results in a change in how the desktop appears, the virtual machine constructs and transmits another desktop image to the client. From the user's perspective, this occurs often fast enough that the displayed desktop is substantially immediately responsive to the user input.

Each virtual machine needs resources in order to operate properly. The physical support environment 201 provides a variety of support resources for each of the virtual machines 210. For instance, some of that support includes hard (physical) support resources such as processing resources, memory resources, storage resources, network access resources, and the like. However, each virtual machine also uses soft support resources, such as software and data, referred to collectively as "virtual machine state". As far as software virtual machine state, the virtual machine may use an operating system, one or more applications, and/or one or more other software modules. As far as data virtual machine state, the host computing system 201 may host some or all of data that is used by the virtual machine in order to operate, such as user preference data, and other application state.

Figure 3:
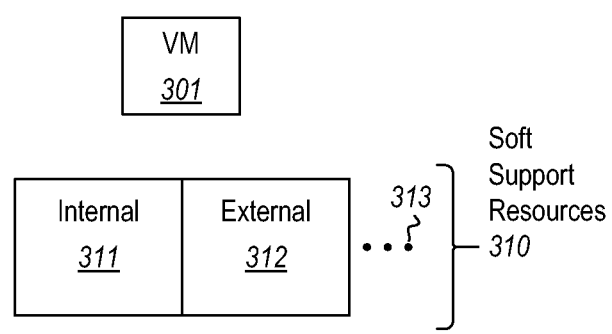
FIG. 3 illustrates a virtual machine in conjunction with internal and external soft support resources that represent localized virtual machine state, and centralized virtual machine state.

Referring to FIG. 3, an environment 300 is shown in which a virtual machine 301 is shown in conjunction with its virtual machine state 310. The virtual machine state 310 includes a localized portion 311, and a centralized portion 312. The ellipses 313 represent that there may be other portions of the virtual machine state 310 as well.

Figure 4:
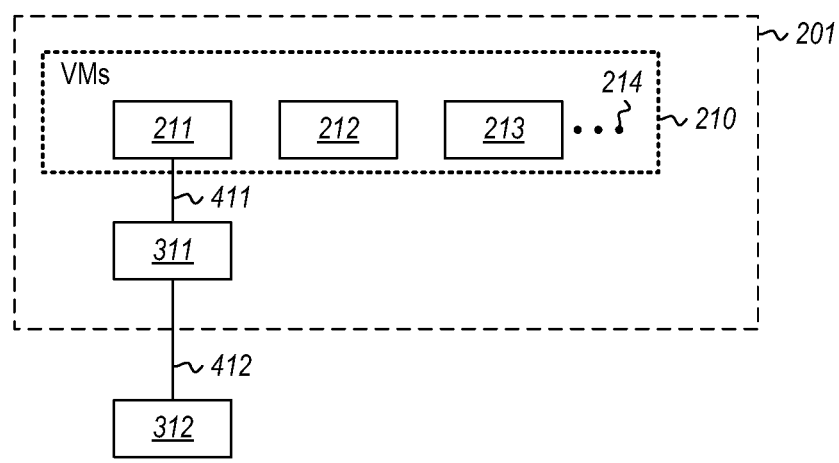
FIG. 4 illustrates the virtual machine environment of FIG. 2 in which one of the virtual machine is shown with its corresponding internal and external soft support resources.

FIG. 4 illustrates a virtual machine environment 400, which is similar to the virtual machine environment 200 of FIG. 2. However, the virtual machine environment 400 illustrates that the virtual machine 211 as including the localized portion 311 of the virtual machine state represented in FIG. 3, and as including the centralized portion 312 of the virtual machine state represented in FIG. 3. In FIG. 4, the localized portion 311 is present in local storage of the host computing system 210, whereas the centralized portion is located outside of the host computing system 210. Although not shown in FIG. 4, the other virtual machines of the host 210 may also have corresponding localized and centralized portions of machine state.

The external virtual machine state 312 is accessed (as represented by line 412) from external to the host computing system 201, and thus may represent a higher latency and slower network connection. The internal virtual machine state is accessed (as represented by line 411) from internal to the host computing system 201, and thus may be lower latency and higher speed access. In accordance with the embodiments described herein, the allocation of soft resources is made in a way that improves performance of the virtual machine, and which also allows for efficient migration of the virtual machine from one physical support environment to another. For instance, although not required, the centralized virtual machine state 312 may be user data, and the localized virtual machine state 311 are backing files that support the virtual machine operating system and application set.

Figure 5A:
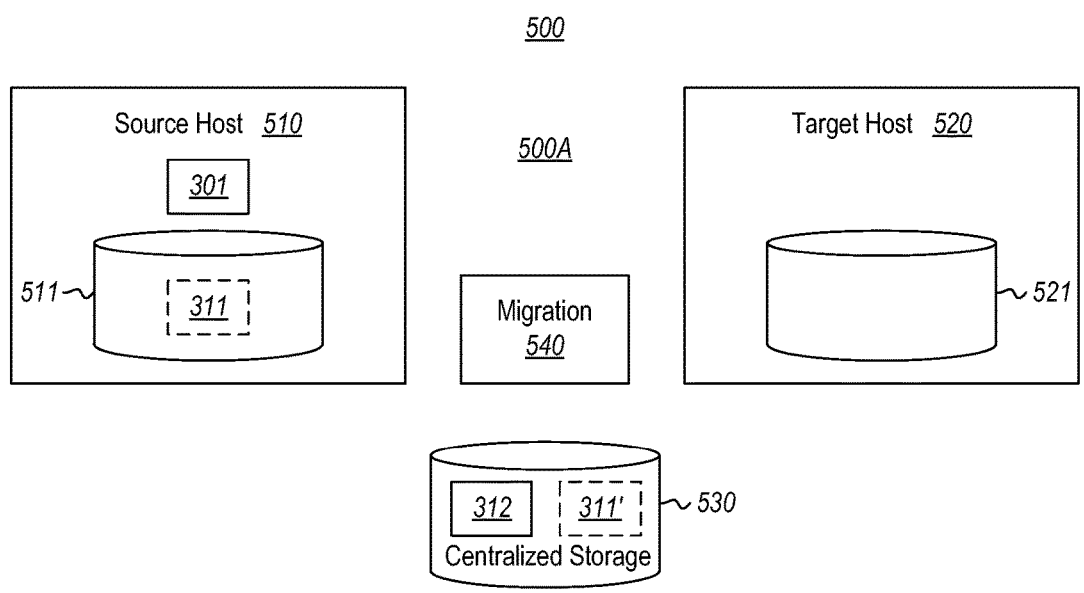
FIG. 5A illustrates an initial state of migration in which the virtual machine to be migrated is still operating on the source host computing system.
Figure 5B:
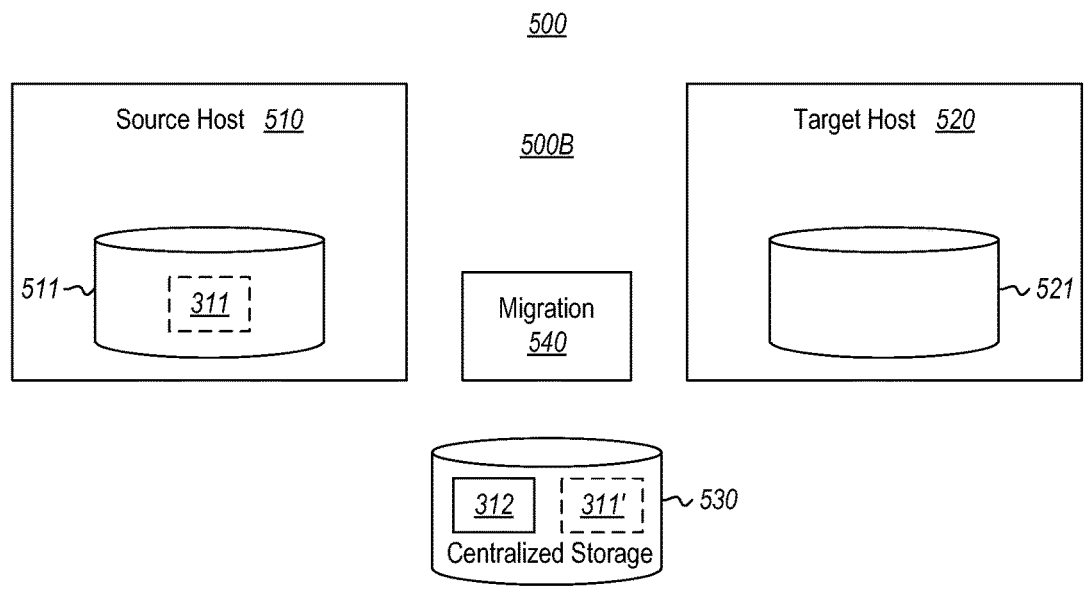
FIG. 5B illustrates a second state of migration in which the virtual machine of FIG. 5A is no longer operating on the source host computing system.
Figure 5C:
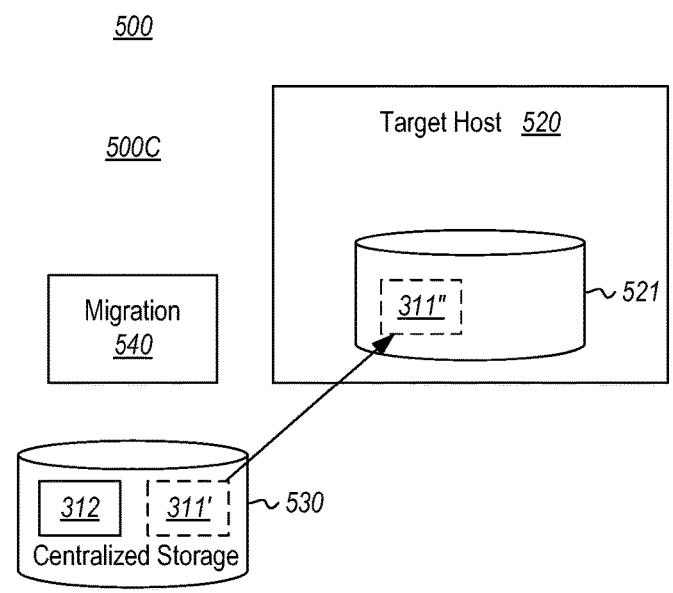
FIG. 5C illustrates a third state of migration in which at least a portion of the backed up localized virtual machine state is restored to the target host computing system.
Figure 5D:
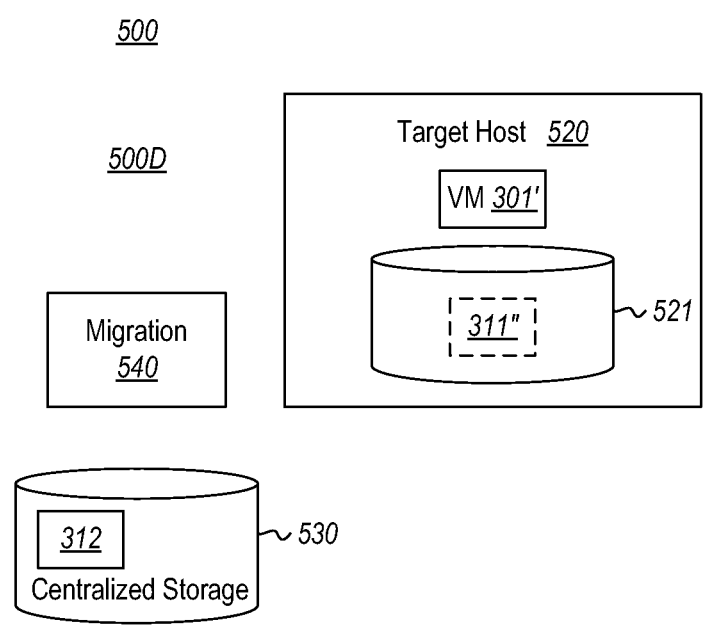
FIG. 5D illustrates a fourth state of migration in which the virtual machine or its equivalent resumes operation on the target host computing system.

The principles described herein relate to the migration of a virtual machine from a source host computing system to a target host computing system. FIG. 5A illustrates a network environment 500 in an initial state 500A. FIGS. 5B through 5D illustrated the network environment 500 in subsequent states 500B through 500D, respectively, or migration.

As illustrated in all of FIGS. 5A through 5D, the network environment 500 includes a source host computing system 510 that has local storage 511, and a target host computing system 520 that also has local storage 521. The source host computing system 510 may be structured as described for the host computing system 201 of FIG. 2. Likewise, the target host computing system 520 may be structured as described for the host computing system 201 of FIG. 2.

The network environment 500 also has centralized storage 530. The centralized storage 530 may be any storage infrastructure, from as simple as a single storage device, to perhaps as complex as a distributed storage network. As an example, the centralized storage 530 may be a storage area network. However, the centralized storage 530 may be any storage that, at least at some point prior to migration, is capable of backing up at least portions of the localized virtual machine state corresponding to the virtual machine that is to be subjected to migration. The centralized storage 530 may also be any storage infrastructure that is accessible to the target host computing system 520 for at least some time during migration in order to restore at least a portion of the backed up localized virtual machine state to the local storage 521 of the target host computing system 520.

The network environment 500 also includes a migration component 540. The migration component 540 may be located on a single computing system, such as the target host computing system 520 or another computing system, or may be distributed across multiple computing systems within the network environment 500. Nevertheless, for clarity in explanation, the migration component 540 is illustrated as a distinct operational component within the network environment 500 of FIG. 5.

In the initial state 500A of FIG. 5A, the source host computing system 510 operates the virtual machine 301 of FIG. 3. The local storage 511 of the source host computing system 510 contains the localized virtual machine state 311 of FIG. 3. The centralized storage 530 contains centralized virtual machine state 312 of FIG. 3. The centralized storage 530 also contains a backed up portion 311' of the localized virtual machine state 311.

Figure 6:
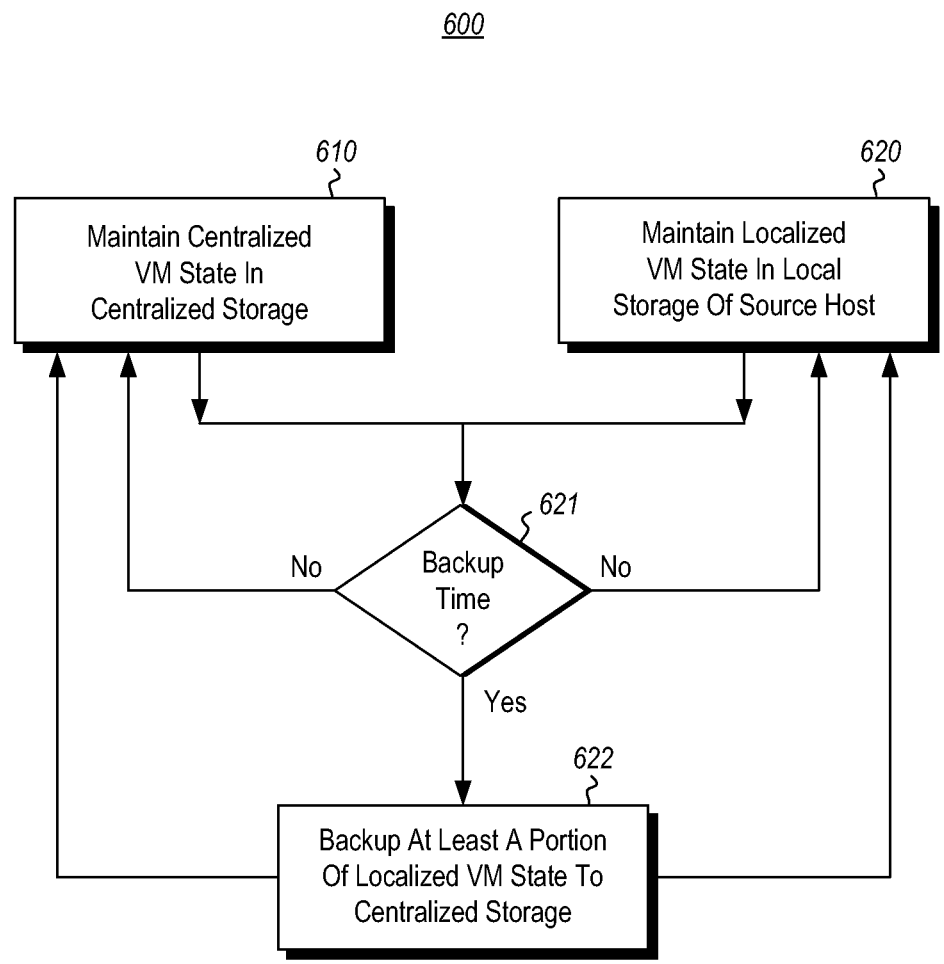
FIG. 6 illustrates a flowchart of a method for preparing from migration of a virtual machine from a source to a target host computing system.

FIG. 6 illustrates a flowchart of a method 600 for preparing for migrating a virtual machine from a source host computing system to a target host computing system. The performance of the method 600 may place the network environment in the initial state 500A illustrated in FIG. 5A. The method 600 maintains a centralized portion of virtual machine state in a storage (act 610) that is accessible to the source host computing system and the target host computing system. For instance, in FIG. 5A, the centralized virtual machine state 312 is maintained in the centralized storage 530 that is accessible to the source host computing system 510 and to the target host computing system 520. In this description and in the claims, the storage need not be "accessible" in the sense that the storage is always available to read data from or write data to, but is "accessible" in the sense that the storage 530 is available to the source host computing system so as to be able to perform the direct or indirect interactions between the source host computing system 510 and the centralized storage 530 described herein, and in the sense that the storage 530 is available to the target host computing system so as to be able to perform the direct or indirect interactions between the target host computing system 520 and the centralized storage 530 described herein.

Referring again to FIG. 6, the method maintains a localized portion of the virtual machine state in the local storage at the source host computing system (act 620). For instance, referring to FIG. 5A, the localized virtual machine state 311 is maintained within the local storage 511 of the source host computing system 510. As an example, the centralized virtual machine state 312 may be user data associated with the virtual machine 301, and the localized virtual machine state 311 may be backing files for the virtual machine 301.

The method 600 determines at discrete times, whether or not it is time to backup a portion of the localized virtual machine state (decision block 621). This determination may be made by, for example, the migration component 540 of FIG. 5. If it is not time to perform the backup operation ("No" in decision block 621), then the virtual machine may continue operating, with the centralized virtual machine state 312 contained within the centralized storage 530 (act 610), and with localized virtual machine state 311 contained within the local storage 511 of the source host computing system (act 620). On the other hand, if it is time to perform the backup operation ("Yes" in decision block 621), then at least a portion 311' of the localized virtual machine is backed up to the centralized storage 530 (act 622), and the operation of the virtual machine 301 may continue using the centralized virtual machine state 312 within the centralized storage 530 (act 610), and with localized virtual machine stage 311 contained within the local storage 511 of the source host computing system (act 620). This backing up operation (act 622) may also be performed by the migration component 540 of FIG. 5.

The backing up of the localized virtual machine state 311 may occur a number of times. However, FIG. 5A represents the most recent backup 311' of the at least a portion of the localized virtual machine state 311. The principles described herein are not limited to how the most recent backup 311' is represented. The backup 311' may be a complete backup, or a previous backup in combination with one or more subsequent incremental backups, or a backup represented in some other form.

The backup 311' need not be a complete representation of the localized virtual machine state 311. For instance, if the localized virtual machine state 311 were the entire set of backing files that support a virtual machine operating system and application set, the backed up localized virtual machine state 311' may have simply enough information from which the localized virtual machine state 311 may be reconstructed within the local memory 521 of the target host computing system 520. For instance, if the backing files contained all of the files associated with a particular operating system, the backup of the backing files need not contain all of such files, but perhaps just an identification of the operating system, and certain configuration settings. Thus, it is possible that the backed up localized virtual machine state 311' might be orders of magnitude smaller than the localized virtual machine state 311 that is actually present within the local storage 511 of the source host computing system 510.

Figure 7:
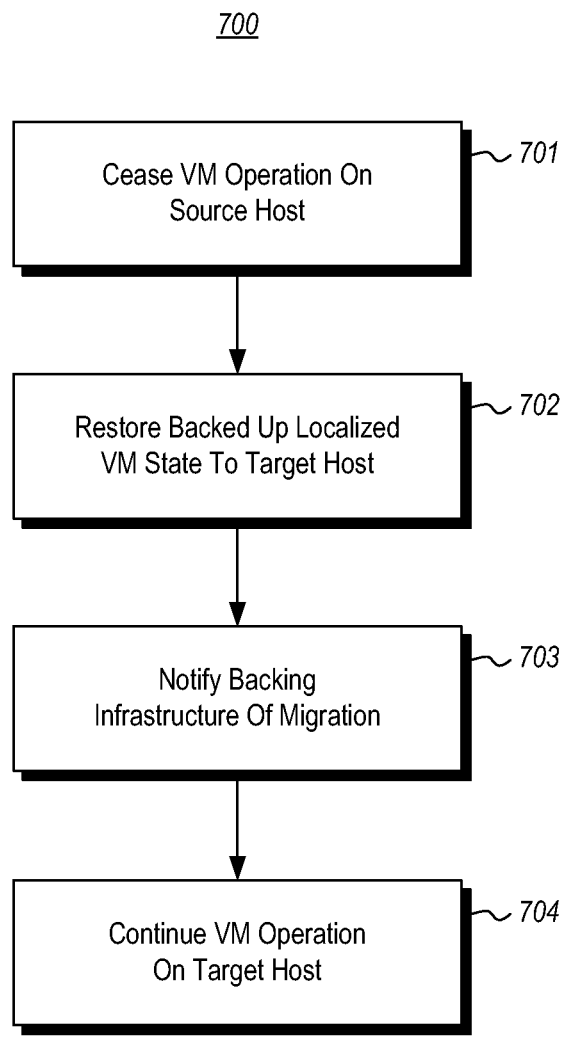
FIG. 7 illustrates a flowchart of a method for performing the migration of the virtual machine from the source host computing system to the target host computing system.

FIG. 7 illustrates a flowchart of a method 700 for performing the migration after the preparation of the method 600 of FIG. 6. The method 700 may be performed by, for instance, the migration component 540 of FIGS. 5A through 5D, or perhaps at the instruction of the migration component 540. For instance, the method 700 may be performed once the migration component 540 determines that migration is appropriate. The principles described herein are not limited to any particular reason why migration might occur. However, example reasons might include load balancing of host computing systems, deteriorating performance of the source host computing system, superior performance of the target host computing system. In one extreme case, perhaps the source host computing system is no longer operational at all, such as might be the case if migration was occurring due to some sort of disaster recovery.

The method 700 includes ceasing operation of the virtual machine on the source host computing system (601). FIG. 5B illustrates a state 500B of the network environment 500 after the virtual machine 301 is no longer operating on the source host computing system 510. FIG. 5B is similar to FIG. 5A, except that the virtual machine 301 is notably absent in FIG. 5B. In the disaster recovery case, for instance, this might be a simple act as the source host computing system 510 might no longer even be capable of running the virtual machine 301, or in other words, the source host computing system 510 may not be sufficiently operable to operate the virtual machine 301. In other cases, the migration component 540 might provide explicit instructions to the source host computing system 510 to cease operation of the virtual machine, with the result that the source host computing system 510 ceases operation of the virtual machine 301.

The virtual machine 301 is caused to cease operation at this point so that the virtual machine 301 no longer makes an attempt to alter the centralized virtual machine state 312 during the period in which migration is occurring. If the virtual machine 301 were to continue operating, then the centralized virtual machine state 312 could experience an inconsistent state.

At some point, unless the source host computing system 510 is permanently disabled, the migration component 540 will cause the source host computing system 510 to update itself to reflect that the source host computing system 510 is no longer tasked with execution of the virtual machine 301. This updating of the source host computing system 510 may be performed immediately if the source host computing system 510 is sufficiently operable to respond to an update instruction. However, if the source host computing system 510 is not sufficiently operable to be so updated (as might be the case if there was a disaster recovery situation), then the migration component 540 queues this update task so that the update task is performed on the source host computing system 510 upon the migration component 540 detecting that the source host computing system 510 is again operable. This protects against the case where the source host computing system 510 continues operation of the virtual machine 301 even though the virtual machine 301 has been migrated to the target host computing system, thereby resulting in inconsistent virtual machine state.

Returning back to FIG. 7, at least a portion of the backed up localized virtual machine state is then restored to the local storage of the target host computing system (act 702). For instance, FIG. 5C illustrates a state 500C of the network environment 500 in which the portion 311" of the backed up localized virtual machine state 311' is restored to the local storage 521 of the target host computing system 520. At this point, the state of the source host computing system 510 is no longer relevant, and so the source host computing system 510 has been removed from FIG. 5C, as compared to FIG. 5B.

This restoration process may use the backed up localized virtual machine state 311' to reconstruct localized virtual machine state 311". For instance, the restoration may involve identifying the operating system version using the operating system identifier in the backed up localized virtual machine state, and then copying all of the relevant operating system files into the local storage 521. If such files are already present within the target host 520, then the files may simply be associated with the localized virtual machine state 311'. Otherwise, the operating system files would also be copied to the target host 520. Operating system configuration information present within the backed up localized virtual machine state may be consulted to determine whether all or just a subset of such files should be copied, and what configuration settings should be applied during the installation process. The backed up localized virtual machine state 311' may also be similarly consulted for installation and configuration of one or more applications that are associated with the virtual machine. Thus, the size of the restored localized virtual machine state 311" may be much larger than the backed up localized virtual machine state 311', and perhaps more comparable to the localized virtual machine state 311 as it was present within the local storage 511 of the source host computing system 510.

In the case of there being multiple potential target host computing systems to which the virtual machine may be migrated, the migration component 540 may be further configured to identify the target host computing system 520 as being the target of the migration of the virtual machine.

Returning back to FIG. 7, the migration component then notifies a backing infrastructure of the migration (act 703) of the restored localized virtual machine state 311" to the target host computing system 520. The backing infrastructure may be, for instance, the collection of one or more components responsible for hosting virtual machines and maintaining a concept of where the backing files are located for each of the virtual machines. As an example, the backing infrastructure may include the hypervisor and any external components that assist the hypervisor in maintaining a concept of where the backing files are located for each virtual machine.

How this is performed may vary significantly according to the virtualization infrastructure. However, in the case of the use of VMWare, this may be accomplished by altering the following tables in the following manner:

In the vCenter backing database (typically a SQL database that the customer configures), performing the following:
    Table VPX_VM:
    Find the record associated with the VM to be migrated.
    Modify the following fields:
        FILE_NAME field:
            change guid associated with old local datastore to guid associated with new local datastore in path to VMX
        LOCAL_FILE_NAME field:
            change guid associated with old local datastore to guid associated with new local datastore in path to VMX
        HOST_ID field:
            change ID to ID of new host
    Table VPX_VM_CONFIG_INFO:
    Find the record associated with the VM to be migrated.
    Modify the following fields:
        FILES_LOG_DIRECTORY field:
            change guid associated with old local datastore to guid associated with new local datastore in path to VM Folder
        FILES_SNAPSHOT_DIRECTORY field:
            change guid associated with old local datastore to guid associated with new local datastore in path to VM Folder
        FILES_VM_PATH_NAME field:
            change guid associated with old local datastore to guid associated with new local datastore in path to VMX FILES_SUSPEND_PATH field:
   change guid associated with old local datastore to guid associated with new local datastore in path to VM Folder Table VPX_SN_CONFIG_INFO:
Find the record associated with the Snapshot(s) of the VM to be migrated.
Modify the following fields:
  FILES_LOG_DIRECTORY field:
   change guid associated with old local datastore to guid associated with new local datastore in path to VM Folder
  FILES_SNAPSHOT_DIRECTORY field:
   change guid associated with old local datastore to guid associated with new local datastore in path to VM Folder
  FILES_VM_PATH_NAME field:
   change guid associated with old local datastore to guid associated with new local datastore in path to VMX
  FILES_SUSPEND_PATH field:
   change guid associated with old local datastore to guid associated with new local datastore in path to VM Folder Table VPX_SN_VDEVICE_FILE_BACKING:
Find all records associated with backing files for drives referenced by the Snapshot(s) of the VM to be migrated that are on a datastore being migrated from.
Modify each of the resultant field sets as follows:
  DATASTORE_ID field:
   change ID to ID of target local datastore
  HARD_DEVICE_BACKING_FILE_NAME field:
   change guid associated with old local datastore to guid associated with new local datastore in path to backing file.

Table VPX_VDEVICE_FILE_BACKING:
Find all records associated with backing files for drives referenced by the VM to be migrated that are on a datastore being migrated from.
Modify each of the resultant field sets as follows:
  DATASTORE_ID field:
   change ID to ID of target local datastore
  HARD_DEVICE_BACKING_FILE_NAME field:
   change guid associated with old local datastore to guid associated with new local datastore in path to backing file.

Table VPX_VM_DS_SPACE:
Find the record associated with the VM to be migrated and the old datastore
Modify the following fields:
  DS_ID field:
   change ID to ID of target datastore Table VPX_VM_FLE_FILE_INFO:
Find the record associated with the VM to be migrated and its replica disk:
Modify the following fields:
  NAME field:
   change the path to the old replica disk to the path to the new replica disk
  TYPE field:
   change value to 'diskExtent'
Find the records associated with each file in the VM to be migrated that are on a datastore being migrated from (not including the replica disk)
  Modify the following fields:
   NAME field:
    change guid associated with old local datastore to guid associated with new local datastore in path to file
   TYPE field:
    change value to appropriate type for file in question In the ADAM database backing for VMware View found on the View Connection Broker server, performing the following:
  Connect to DC=vdi,DC=vmware,DC=int [localhost]
  Examine OU=ServerGroups
  Find the CN entry for your pool and pull its attributes
  Pull the value for the attribute pae-SVIVmDatastore
  Remove the reference to the old datastore
  Add a reference to the new datastore
  Pull the value for the attribute pae-VmDatastore
  Remove the reference to the old datastore
  Add a reference to the new datastore
  Pull the value for the attribute pae-MemberDN
  (this is the list of guids associated with the VMs in the pool).

In the case of VMware View, the tables are examined to locate the appropriate replica disk as follows. The source VM's parent VM and snapshot are determined. This can be done in a variety of ways—from using vmware APIs to mining the vCenter database for the information. The SVI_SIM_CLONE table is joined to the SVI_REPLICA table on SVI_SIM_CLONE.REPLICA_ID=SVI_REPLICA.ID. The resultant dataset is examined to find the set of all replica disks that share the same GOLDEN_MASTER_VM_MOID and GOLDEN_MASTER_VM_SS_MOID values with the source virtual machine. The REPLICA_MOID field from the above dataset gives the list of potential 'identical' replica disks on various datastores. The vCenter VPX_DS_ASSIGNMENT table is examined to find one of the replica disks that maps to the desired target datastore. If none exists, then a replica disk must be created on the target local datastore before the migration can succeed. This can be done in a variety of ways including creating a VM on the target datastore using the same parent image and snapshot.

A unique identifier (such as a MOID in the following example) translates to table ID values as follows:
A VM with an ID of 4567 will have a MOID of vm-4567.
A VM with a MOID of vm-1234 will have an ID of 1234.

Once an appropriate replica disk is selected, all VM records in the REPLICA_ID field in the SVI_SIM_CLONE table must be adjusted to point to the new replica disk to keep the reference counting done by VMware View correct.

In the case of VMWare, the centralized virtual machine state 312 may be modified to reflect the new location of the virtual machine. However, the principles described herein are not limited to any particular virtualization infrastructure.

In the state 500C of FIG. 5C, and with the backing infrastructure properly notified of the migration of the virtual machine, the virtual machine 301' is loaded on the target host computing system (act 704) using the restored localized virtual machine state 311". At this point, the virtual machine 301" may operate upon the centralized virtual machine state 312 and upon the localized virtual machine state 311". The recreation of the virtual machine 301' is represented in the state 500D of FIG. 5D.

The virtual machine 301' after migration may not be identical to the virtual machine 301 before migration. For instance, the restoration depends on the most recent backed up localized virtual machine 301'. This backup operation occurs at discrete points, and thus changes to the localized virtual machine state 301 that occurred after the latest backup are not reflected in the migrated virtual machine 301'. In one embodiment, if the source host computing system 510 is still operational when the migration decision is made, the decision to migrate might cause a backup of the localized virtual machine state 311 to occur, thereby reducing the differences between the migrated virtual machine 301' and the unmigrated virtual machine 301 caused by changes to the localized virtual machine state after backup.

The migrated virtual machine 301' may also be different than the original virtual machine 301 for other reasons as well. For instance, perhaps certain portions of the localized virtual machine 301 state are not backed up. As an example, the backup may not include a reconstructable portion of the localized virtual machine state 301. In that case, the portion be recreated during restoration, rather than copied. In addition, the restored localized virtual machine state 311" may endure other modification to reflect that the virtual machine 301' is now operating on the target host computing system 520.

However, the migrated virtual machine 301' is the same as or at least the equivalent of the original virtual machine 301 in the sense that Virtual machines can be defined to be equivalent if they meet the following criteria. As for hardware attributes, the equivalent virtual machines have the same MAC address. Also, for disks that existed in the original virtual machine at the point of its backup, the virtual machines should have the same drive geometry (size and so forth), the same disk Universally Unique Identifier (UUID), the same processor, the same memory, the same BIOS UUID, and the same hardware UUID. As for software, the following characteristics are to be the same as the original virtual machine at the point of its backup: operating system, installed software, and user/profile disk.

In the case of catastrophic failure, the actual image files for the disk will be different than the current version of the virtual machine that was lost. The replacement disk is based upon a snapshot of the state of the original drive at time of backup. It therefore will be the same size and have the same UUID, but with contents equivalent to the original disk at the time of the snapshot. To be equivalent, a target virtual machine cannot have less disks than the original virtual machine, but it may be acceptable for the target virtual machine to have additional drives that were unknown to the original virtual machine. It may in some cases be permissible for the target virtual machine to have additional hardware that was not present on the original virtual machine. These include (but are not limited) to additional RAM, or additional peripherals that do not affect the base software load (like CD-ROMs).

Accordingly, an efficient mechanism for migrating a virtual machine has been described in the context in which a portion of the virtual machine state is localized on the host computing system, and a portion of the virtual machine state is centralized at a location accessible to multiple host computing systems.

The mechanism may be applied for migrating multiple virtual machines in which case the method of FIGS. 6 and 7 may be applied once for each virtual machine. However, to more efficiently perform migration in the case where some of the backing files for the virtual machines have common material, this common material could be specified, thereby preventing any unnecessary copying of the backing files.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for migrating a virtual machine from a source host computing system to a target host computing system, the method comprising:
   maintaining a centralized portion of virtual machine state in a storage that is accessible to the source host computing system and the target host computing system;
   maintaining a localized portion of the virtual machine state in local storage at the source host computing system, the local storage at the source host computing system being inaccessible to the target host computing system;
   backing up a backed up portion of the localized portion of the virtual machine state in a storage that is accessible to the source host computing system and the target host computing system, wherein
      a remaining portion of the localized portion of the virtual machine state is not backed up in the storage that is accessible to the source host computing system and the target host computing system,
      the remaining portion of the localized portion of the virtual machine state comprises at least one operating system file associated with an operating system, and
      the backed up portion of the localized portion of the virtual machine state comprises an operating system identifier for identifying the at least one operating system file;
   ceasing operation of the virtual machine on the source host computing system;
   restoring the localized portion of the virtual machine state to local storage of the target host computing system, wherein
      a portion of the restored localized portion of the virtual machine state is restored based on the backed up portion of the localized portion of the virtual machine state, and
      restoring of the restored localized portion of the virtual machine state is completed using the operating system identifier included in the backed up portion of the localized portion of the virtual machine state to identify the at least one operating system file; and
   loading the virtual machine on the target host computing system using the restored localized portion of the virtual machine state including the at least one operating system file.

2. The method in accordance with claim 1, further comprising:
   modifying the restored localized portion of the virtual machine state to reflect virtual machine operation on the target host computing system, rather than the source host computing system.

3. The method in accordance with claim 1, wherein ceasing operation of the virtual machine is performed as a result of the source host computing system no longer being sufficiently operable to operate the virtual machine.

4. The method in accordance with claim 1, wherein ceasing operation of the virtual machine is performed as a result of explicit instructions to the source host computing system to cease operation of the virtual machine.

5. The method in accordance with claim 1, wherein the target host computing system is a plurality of potential target host computing systems to which the virtual machine may be migrated, the method further comprising:

identifying the target host computing system as being the target of the migration of the virtual machine.

6. The method in accordance with claim 1, wherein the storage in which the centralized portion of the virtual machine state is maintained is the same as the storage in which the backed up portion of the localized portion of the virtual machine state is backed up.

7. The method in accordance with claim 1, wherein the localized portion of the virtual machine state comprises backing files for the virtual machine.

8. The method in accordance with claim 1, wherein the centralized portion of the virtual machine state comprises user data associated with the virtual machine.

9. A computer program product comprising at least one computer storage media having thereon computer-executable instructions that, when executed by at least one processors of a computing system, cause the computing system to perform a method for migrating a virtual machine from a source host computing system to a target host computing system in a context in which a centralized portion of virtual machine state is maintained in a storage that is accessible to both the source host computing system and the target host computing system and a localized portion of the virtual machine state is maintained in local storage of the source host computing system, the local storage of the source host computing system being inaccessible to the target host computing system, the method comprising:
    backing up a backed up portion of the localized portion of the virtual machine state in a storage that is accessible to the source host computing system and the target host computing system, wherein
        a remaining portion of the localized portion of the virtual machine state is not backed up in the storage that is accessible to the source host computing system and the target host computing system,
        the remaining portion of the localized portion of the virtual machine state comprises at least one operating system file associated with an operating system, and
        the backed up portion of the localized portion of the virtual machine state comprises an operating system identifier for identifying the at least one operating system file;
    restoring at least a portion of the backed up localized portion of the virtual machine state to local storage of the target host computing system once operation of the virtual machine on the source host computing system has ceased, wherein
        a portion of the restored localized portion of the virtual machine state is restored based on the backed up portion of the localized portion of the virtual machine state, and
        restoring of the restored localized portion of the virtual machine state is completed using the operating system identifier included in the backed up portion of the localized portion of the virtual machine state to identify the at least one operating system file; and
    loading the virtual machine on the target host computing system using the restored localized portion of the virtual machine state including the at least one operating system file.

10. The computer program product in accordance with claim 9, wherein the restored portion corresponds to a swap file and the restored portion comprises at least a portion of the remaining portion.

11. The computer program product in accordance with claim 9, wherein the method further comprises:
    modifying the restored localized portion of the virtual machine state to reflect virtual machine operation on the target host computing system, rather than the source host computing system.

12. The computer program product in accordance with claim 9, wherein the ceasing operation of the virtual machine is performed as a result of explicit instructions to the source host computing system to cease operation of the virtual machine, wherein the method further comprises:
    generating the explicit instructions to the source host computing system.

13. The computer program product in accordance with claim 9, wherein the target host computing system is a plurality of potential target host computing systems to which the virtual machine may be migrated, the method further comprising:
    identifying the target host computing system as being the target of the migration of the virtual machine.

14. The computer program product in accordance with claim 9, wherein the storage in which the centralized portion of the virtual machine state is maintained is the same as the storage in which the backed up the portion of the localized portion of the virtual machine state is backed up.

15. The computer program product in accordance with claim 9, wherein the localized portion of the virtual machine state comprises backing files for the virtual machine.

16. The computer program product in accordance with claim 9, wherein the centralized portion of the virtual machine state comprises user data associated with the virtual machine.

17. A network environment comprising:
    a source host computing system operating thereon a virtual machine supported by backing files stored in local storage of the source host computing system, the local storage of the source host computing system being inaccessible to the target host computing system;
    a target host computing system;
    a backing infrastructure accessible to the target host computing system;
    a storage infrastructure having thereon user data associated with the virtual machine, the storage infrastructure being accessible to both the source host computing system and the target host computing system; and
    a migration component configured to
        periodically back up a backed up portion of the backing files to the storage infrastructure, wherein
            a remaining portion of the backing files is not backed up in the storage infrastructure accessible to both the source host computing system and the target host computing system,
            the remaining portion of the localized portion of the virtual machine state comprises at least one operating system file associated with an operating system, and
            the backed up portion of the localized portion of the virtual machine state comprises an operating system identifier for identifying the at least one operating system file;
        determine whether the virtual machine is to be migrated from the source host computing system to the target host computing system,
        restore at least a portion of the backed up portion of the virtual machine state to local storage of the target host computing system based on the backed up portion of the backing files,
        complete the restoration of the restored localized portion of the virtual machine state using the operating system identifier included in the backed up portion of the localized portion of the virtual machine state to identify the at least one operating system file, and load the virtual machine on the target host computing system using the restored localized portion of the virtual machine state including the at least one operating system file after operation of the virtual machine on the source host computing system has ceased.

18. The method of claim 1, wherein the backing infrastructure maintains, for the virtual machine, (i) access to a plurality of backing files for providing the localized portion of the virtual machine state and (ii) a virtual machine concept representing the plurality of backing files; and the remaining portion comprises the plurality of backing files.

19. The computer program product of claim 9, wherein the backing infrastructure maintains, for the virtual machine, (i) access to a plurality of backing files for providing the localized portion of the virtual machine state and (ii) a virtual machine concept representing the plurality of backing files; and the remaining portion comprises the plurality of backing files.

20. The method in accordance with claim 1, wherein restoring of the restored localized portion of the virtual machine state is completed by using the operating system identifier included in the backed up portion of the localized portion of the virtual machine state to determine that the at least one operating system file is available on the target host computing system.

21. The method in accordance with claim 1, wherein restoring of the restored localized portion of the virtual machine state is completed by notifying the backing infrastructure of the migration of the restored localized portion of the virtual machine state to the target host computing system; and, obtaining the at least one operating system file from the backing infrastructure using the operating system identifier included in the backed up portion of the localized portion of the virtual machine state.

22. The method in accordance with claim 1, wherein the operating system identifier identifies the operating system and a set of operating system files associated with the operating system;

the set of operating system files associated with the operating system comprises the at least one operating system file;

the backed up portion of the localized portion of the virtual machine state further comprises operating system configuration information for identifying a subset of files within the set of files associated with the operating system, the subset of files comprising the at least one operating system file;

restoring of the restored localized portion of the virtual machine state is completed by using the operating system identifier and the operating system configuration information to identify the subset of files associated with the operating system; and, loading the virtual machine on the target host computing system using the restored localized portion of the virtual machine state includes loading the subset of files associated with the operating system without loading other files in the set of files associated with the operating system.

* * * * *